(12) United States Patent
Zito

(10) Patent No.: US 9,576,275 B2
(45) Date of Patent: Feb. 21, 2017

(54) SYSTEM AND METHOD FOR ARCHIVING AND RETRIEVING MESSAGES

(75) Inventor: Jack E. Zito, Yaphank, NY (US)

(73) Assignee: CA, Inc., New York, NY (US)

( * ) Notice: Subject to any disclaimer, the term of this patent is extended or adjusted under 35 U.S.C. 154(b) by 909 days.

(21) Appl. No.: 12/498,127

(22) Filed: Jul. 6, 2009

(65) Prior Publication Data

US 2011/0004663 A1    Jan. 6, 2011

(51) Int. Cl.
*G06F 15/16*  (2006.01)
*G06Q 10/10*  (2012.01)

(52) U.S. Cl.
CPC .................................. *G06Q 10/107* (2013.01)

(58) Field of Classification Search
CPC . H04L 12/589; H04M 1/72552; G06Q 10/107
USPC ...... 709/206; 705/7.13, 7.17, 7.21; 718/104, 718/107; 719/313, 318
See application file for complete search history.

(56) References Cited

U.S. PATENT DOCUMENTS

| | | | |
|---|---|---|---|
| 2004/0006600 A1* | 1/2004 | Miller et al. | 709/206 |
| 2005/0165852 A1* | 7/2005 | Albornoz et al. | 707/200 |
| 2008/0086369 A1* | 4/2008 | Kiat et al. | 705/14 |
| 2008/0086530 A1* | 4/2008 | Gandhi et al. | 709/206 |
| 2008/0195953 A1* | 8/2008 | Sen | 715/744 |
| 2008/0201433 A1* | 8/2008 | McDonald | 709/206 |
| 2009/0125602 A1* | 5/2009 | Bhatia et al. | 709/207 |
| 2010/0017194 A1* | 1/2010 | Hammer et al. | 704/9 |

* cited by examiner

*Primary Examiner* — Phuoc Nguyen
(74) *Attorney, Agent, or Firm* — Baker Botts L.L.P.

(57) ABSTRACT

A method comprises establishing by a computer an audience element comprising a particular combination of one or more addresses. The method further comprises creating a first relationship between the audience element and at least one of the one or more addresses. The method also comprises creating a second relationship between one or more messages and the audience element. The method further comprises utilizing the first relationship and the second relationship to identify one or more messages associated with one or more particular addresses.

20 Claims, 2 Drawing Sheets

SYSTEM AND METHOD FOR ARCHIVING AND RETRIEVING MESSAGES

TECHNICAL FIELD

This disclosure relates in general to computer systems and more particularly to a method and system for archiving and retrieving messages.

OVERVIEW

Archiving systems may be used to store and index messages to allow for search and retrieval. In some applications, millions of messages or more may need to be stored and indexed for fast retrieval. Information about the messages, such as sender and recipient, may also be stored and indexed. Storing some of this information may result in significant overhead to the archiving system.

SUMMARY OF EXAMPLE EMBODIMENTS

In accordance with one embodiment of the present disclosure, a method comprises establishing by a computer an audience element comprising a particular combination of one or more addresses. The method further comprises creating a first relationship between the audience element and at least one of the one or more addresses. The method also comprises creating a second relationship between one or more messages and the audience element. The method further comprises utilizing the first relationship and the second relationship to identify one or more messages associated with one or more particular addresses.

In accordance with another embodiment of the present disclosure, a method comprises establishing by a computer an audience element comprising a first combination of one or more addresses. The method further comprises creating an audience identifier associated with the audience element. The method also comprises determining whether the audience identifier is stored. If the audience identifier is not stored, the method comprises storing the audience identifier and associating the audience element with the audience identifier. If the audience identifier is stored, the method comprises associating the audience element with the stored audience identifier.

In accordance with yet another embodiment of the present disclosure, a system comprises a memory operable to store one or more messages and one or more audiences. The system also comprises a processor operable to perform the steps of: establishing an audience element comprising a particular combination of one or more addresses; creating a first relationship between the audience element and at least one of the one or more addresses; creating a second relationship between one or more messages and the audience element; and utilizing the first relationship and the second relationship to identify one or more messages associated with one or more particular addresses.

Numerous technical advantages are provided according to various embodiments of the present disclosure. Particular embodiments of the disclosure may exhibit none, some, or all of the following advantages depending on the implementation. In certain embodiments, a lesser number of message address audiences may be stored, reducing the amount of memory used for data storage. In other embodiments, faster search and retrieval of messages may be realized.

Other technical advantages of the present disclosure will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present disclosure and its advantages, reference is now made to the following description, taken in conjunction with the accompanying drawings, in which.

DETAILED DESCRIPTION

Typical email archiving, supervision, discovery, and recovery applications store every email address found in every email message for a company or group of companies. For example, a list of all recipients for each message may be maintained, including whether the recipients are in the "To" field, the "Cc" field, or the "Bcc" field. This information may comprise one or more entries in a database or index server. Tracking these relations may require large amounts of storage and/or processing power, and may increase search times when performing a search on the stored data. However, in many instances a sender of messages will address messages to certain audiences, and then reuse those audiences numerous times for future messages. These message address audiences may be categorized and stored so that they do not have to be re-stored each time a message reuses the message address audience. This may result in a smaller amount of message address audiences for a given set of messages, which may reduce search and retrieval times.

Figure 1:
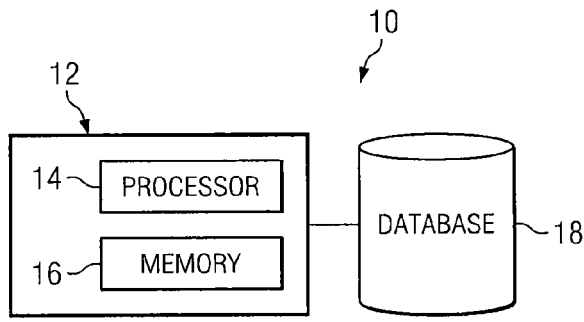
FIG. 1 illustrates a system for archiving and retrieving messages.

FIG. 1 illustrates a system 10 for archiving and retrieving messages. In this example embodiment, system 10 includes computer 12 and database 18. Computer 12 may include any combination of hardware and/or software operable to perform operations in system 10. As one example, computer 12 may include a workstation operable to allow a user to perform operations in system 10. Database 18 may include any type of storage suitable for storing and indexing one or more types of messages and may be accessible to (or included within) one or more computers 12. Other embodiments of system 10 may additionally or alternatively include an index server.

Computer 12 may include a processor 14 and memory 16. Processor 14 and memory 16 may be used in the performance of operations, such as searches, in system 10. Although not shown, system 10 may include any suitable type of user interface for interacting with system 10. Operations in system 10 may be executed using, for example, software or logic. The software or logic may be embodied on a computer readable medium, such as memory (ROM, RAM, flash memory, solid state disk drives, etc.); tape; removable storage devices; CDs, DVDs, or other optical media; or any other type of computer readable medium. The computer readable medium may include non-volatile memory, such as ROM, flash memory, or disk drives, or volatile storage such as RAM, cache memory, or buffers.

System 10 may be used, in one example, for archiving and retrieving messages. System 10 may be used to store all or a portion of the emails sent to and/or received by members of an organization, such as a corporation. Any appropriate email program may be used, and the messages may be stored in a database, such as database 18, using any suitable software and/or hardware. As one example, emails from a business may be loaded into a database or index server for future searching and retrieval. The messages may be stored for a variety of reasons, including backup, recovery, supervision, searching, or legal discovery. When the emails are loaded, various components of each email may be stored in one or more tables. The sender and one or more recipients may be stored, as well as the date and time of the email, the subject line, and the body of the email. One solution is to store each of these components (and any others) separately for each email. However, this may lead to redundant data being stored in some instances. Certain embodiments of the present disclosure provide for storing recipient information in a hashed form to reduce storage and processing overhead required to retrieve messages while maintaining full functionality.

Users of email or other messaging systems may reuse their message audiences in many instances. Because audiences are reused, there may be a smaller number of audiences than messages. As one example, a user may send a weekly progress report via email to his co-workers, and copy his manager on the email. In this example, this configuration of recipients may be referred to as the audience (or audience element) for the message. System 10 may be used to store each of these weekly progress report emails for future search and retrieval. System 10 may store the audience once, and also store the audience in a hashed form. If that audience is reused in another email (for example, another weekly progress report), the audience may not need to be stored again. Storing the audiences in this manner may reduce storage space and processing times.

In a particular embodiment, for example, a sender may send an email to an audience comprising the following email addresses:

To: a@a.com, c@a.com, b@a.com
Cc: d@a.com
Bcc: c@a.com

The recipients in the "To" field may be referred to as primary recipients; the recipients in the "Cc" field may be referred to as secondary recipients; and the recipients in the "Bcc" field may be referred to as tertiary recipients.

To store the message in system 10, one or more procedures may be performed on the address audience. These procedures may be performed in any suitable order, and procedures may be dropped or added in other embodiments. For example, the addresses may be normalized, marked, and/or serialized. The addresses may be lowercased (or normalized), as many addressing standards are order and case insensitive. The addresses may also be marked to indicate which addresses are primary, secondary, or tertiary recipients. The addresses may also be serialized into a string or buffer that may be hashed. After normalizing, marking, and/or serializing, the addresses in the example above may appear as:

'to: a@a.com, b@a.com, c@a.com; cc: d@a.com; bcc: c@a.com'

The serialization may be hashed using any suitable algorithm. In some embodiments, the serialization may be hashed using MD5. Other embodiments may utilize SHA-256, SHA-384, or any other suitable hashing function. Hashing the serialization may create an audience identifier for the message audience. An audience identifier created with MD5 may be similar to this identifier:

e4ba9856758d170e5701c3212d301a87

The audience identifier may be stored, along with the relationship between the identifier and the message audience associated with the identifier. The relationship between one or more addresses and the message audience may also be stored, as well as the relationship between one or more addresses and the identifier. One or more of these relationships may be used for storing messages in the database or for retrieving messages during a search of the database.

When a new message needs to be stored in the database, the message audience associated with the new message may be normalized, marked, serialized, and/or hashed. The hash that is created from the new message audience may be compared to other hashes previously stored in the database. If a match is found, the message audience of the new message does not need to be stored again. In some embodiments, this may greatly reduce the number of message audience elements that have to be stored and tracked in the database. Users of email systems often reuse their message audiences; in some instances audiences may be reused 95% of the time. Instead of storing each of these audiences separately, the audience may be stored once and future messages that use that audience may store the hash or a pointer to the audience. When messages that have a particular audience or addressee are requested, the hash and the relationships between the hash and the audience elements may be used to find the messages. Storing message audiences in this manner may lead to reduced storage space to store the messages and lower processing overhead to retrieve messages.

Figure 2:
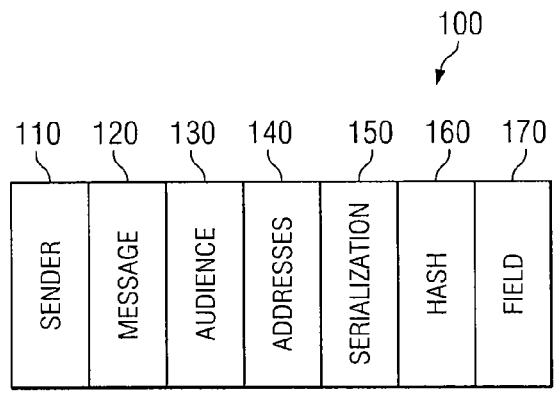
FIG. 2 illustrates an example table in a database used for archiving and retrieving messages.

FIG. 2 illustrates an example table 100 used for archiving and retrieving messages. Table 100 may be stored in database 18 and may include any suitable elements, arranged in any suitable manner. Some elements shown may not be present in all embodiments, and other elements not shown may be present in other embodiments.

As one example, table 100 may include a sender 110, a message body 120, an audience 130, addresses 140, a serialization 150, and a hash 160. Sender 110 may include the sender of the email or other message. In some embodiments this may include a person that has a message sent on their behalf. Message 120 may include the body of the message. Attachments to the message may also be stored in message 120 or in other tables or databases. Audience 130 may include, for example, a listing of each of the recipients of a given message. Addresses 140 may include the addresses of each of the recipients of a given message listed as separate elements to provide for advanced searching capabilities. Serialization 150 may include a serialized audience element associated with each message. Hash 160 may include the hash of the serialization of the audience for the message. The hash may be produced using any suitable hashing algorithm.

When a new message is ready to be stored in the database, the message may be stored and the audience may be serialized and hashed. The hash of the new message may be compared to each of the existing hashes in the database. If a match is found, the audience is already stored in the database and does not have to be stored again for the new message. Instead, the hash for the new message may be stored (or a pointer to the previously stored hash) and searches may be performed using the hash as a key for that particular audience.

Information may also be stored, for example, in a "field" element 170 of database 18 that maps where addresses are located within an audience. For example, it may be useful in some applications to know whether a certain recipient of a message was in the "To" field, the "Cc" field, or the "Bcc" field. This information may be stored in the database for some or all of the addresses of one or more messages. Searches may then be performed that find, for example, all messages where a particular employee was copied in the "Bcc" field.

Figure 3:
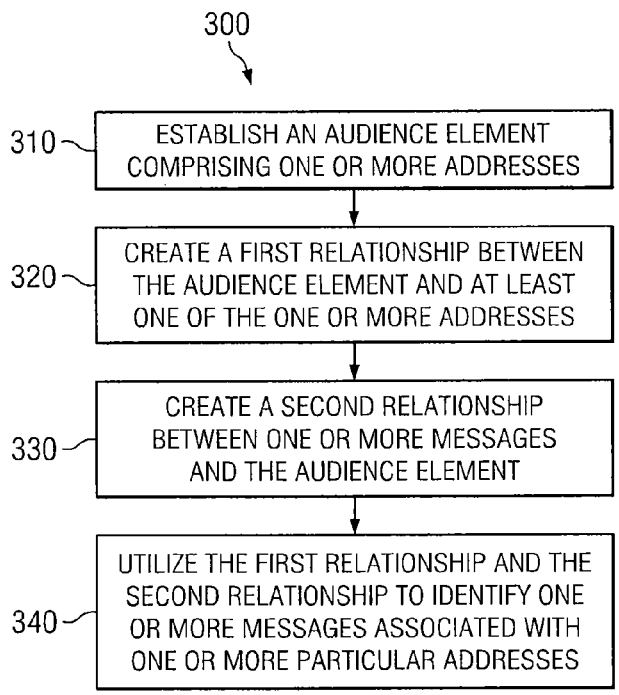
FIG. 3 is a flowchart illustrating an example method for archiving and retrieving messages.

FIG. 3 is a flowchart illustrating an example method 300 for archiving and retrieving messages. The steps illustrated in FIG. 3 may be combined, modified, or deleted where appropriate. Additional steps may also be added to the example operation. Furthermore, the described steps may be performed in any suitable order. The messages and other elements may be stored in a database or index server for future queries or searches. The database or index server may comprise any appropriate hardware and/or software.

The process begins with step 310. In step 310, an audience element of a message comprising one or more addresses is established. The audience element may be stored in any suitable location in any suitable manner. Any appropriate actions may be performed on the audience element, such as normalizing, marking, serializing, and/or hashing.

In step 320, a first relationship between the audience element and at least one of the one or more addresses may be created. This relationship may be used in queries or searches involving the messages stored in the database or index server.

In step 330, a second relationship between one or more messages and the audience element may be created. The second relationship may be used to link one or more messages to the specific audience for that message. In some embodiments, the audience may be stored one time in the database for a first message, and other messages that utilize that same audience may store a pointer or hash for the audience, instead of storing the entire audience again. This may reduce storage space and lower processing loads when retrieving messages from the database.

In step 340, the first relationship and the second relationship may be utilized to identify one or more messages associated with one or more particular addresses. As an example, a search may be performed on the messages stored in the database to retrieve all messages sent to a particular employee of a company. The relationship between that employee's email address and the audience elements may be used, along with the relationship between the messages and the audience element, to identify any or all of the messages associated with that employee's email address.

Figure 4:
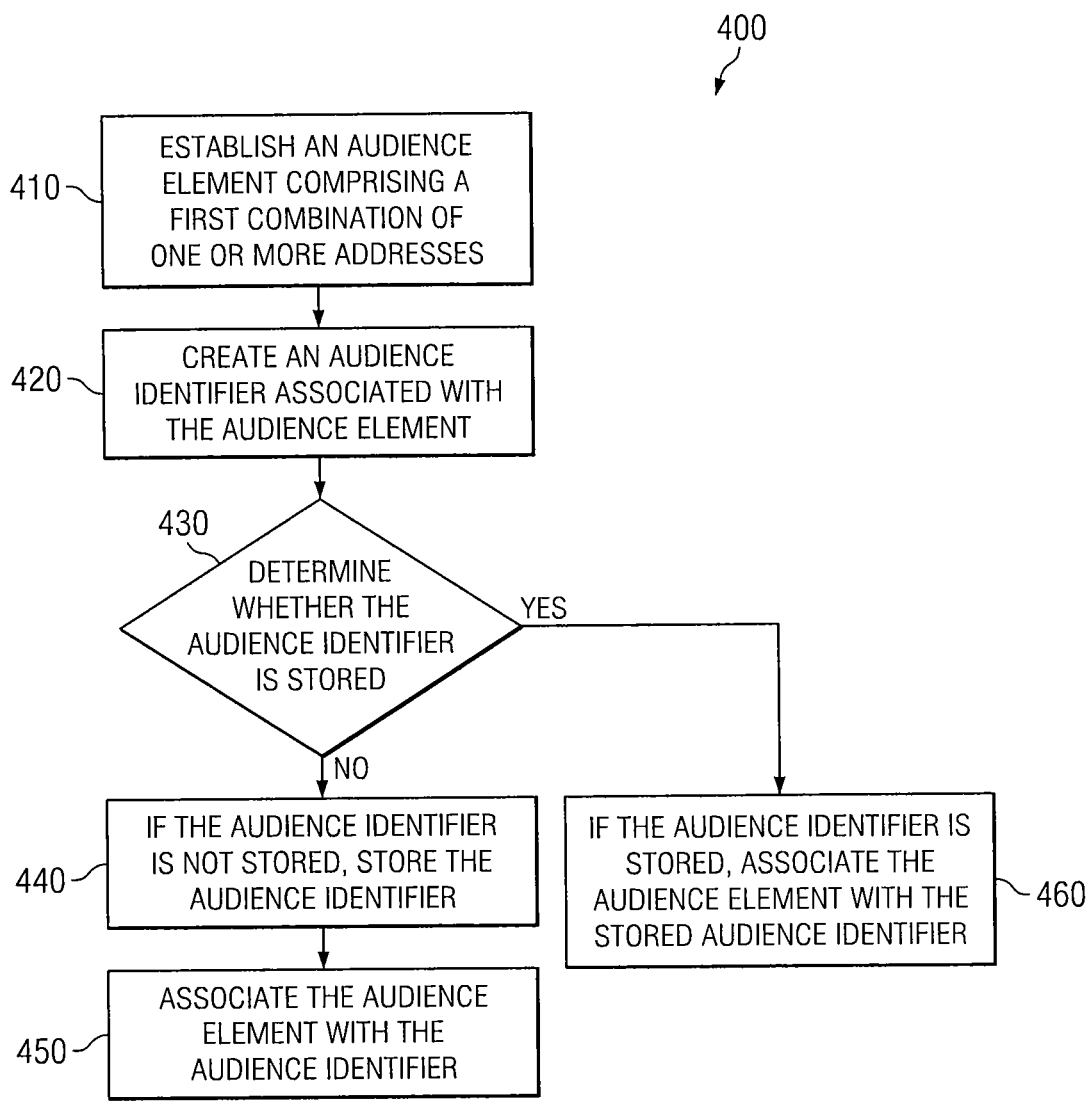
FIG. 4 is a flowchart illustrating an example method for archiving and retrieving messages.

FIG. 4 is a flowchart 400 illustrating an example method for archiving and retrieving messages. The steps illustrated in FIG. 4 may be combined, modified, or deleted where appropriate. Additional steps may also be added to the example operation. Furthermore, the described steps may be performed in any suitable order. The messages and other elements may be stored in a database or index server for future queries or searches. The database or index server may comprise any appropriate hardware and/or software.

The process begins at step 410. An audience element is established comprising a first combination of one or more addresses. The audience element may be stored in any suitable database or index server comprising hardware and/or software.

In step 420, an audience identifier associated with the audience element may be created. The identifier may comprise any suitable type of identifier. In some embodiments, the identifier created is unique to that audience element. In one embodiment, the audience element may be normalized, marked, serialized, and/or hashed to create the audience identifier as described above. Any suitable hashing algorithm may be used. Step 420 and other steps may be performed by any suitable processor or other hardware, utilizing any suitable memory and/or any suitable software.

In step 430, it is determined whether the audience identifier is stored in the database or index server. Any suitable mechanism may be used to make this determination. If the audience identifier is not stored, the process moves to step 440. If the audience identifier is already stored, the process moves to step 460.

In step 440, the audience identifier is stored in the database or index server. Because the audience identifier was not found, the particular audience associated with the identifier has not already been stored. The audience may be stored, along with its identifier, for future searching and retrieval operations. The audience and its identifier are also available in case future messages reuse that particular audience.

In step 450, the audience element is associated with the audience identifier. This relationship allows searching and retrieval operations to locate audience elements using the audience identifier.

If, in step 430, the audience identifier is determined to have already been stored, the process moves to step 460. In step 460, if the audience identifier is stored, the audience element is associated with the stored audience identifier. Because the identifier was found already stored in the database, the audience associated with that identifier is already stored. Thus, storage space may be saved by not storing the audience element again, but instead associating the new message with the appropriate audience identifier that is already stored. The audience identifier may comprise a smaller storage space than the audience element. The reduction in size of the database may also increase the speed of operations in the system.

Although the embodiments in the disclosure have been described in detail, numerous changes, substitutions, variations, alterations, and modifications may be ascertained by those skilled in the art. For example, while the illustrated embodiments have been described in reference to email messaging, some embodiments may operate in conjunction with other messaging formats such as instant messaging, text messaging, and the like. In addition, certain embodiments may utilize more than one computing system to execute and/or run the disclosed methods and applications. It is intended that the present disclosure encompass all such changes, substitutions, variations, alterations and modifications as falling within the spirit and scope of the appended claims.

What is claimed is:

1. A method comprising:
   establishing by a computer an audience element comprising a first combination of addresses identified as recipient addresses for one message;
   creating a first relationship between the audience element and the first combination of addresses;
   determining whether a second combination of addresses identified as recipient addresses for another message matches the first combination of addresses;
   creating a second relationship between the other message and the audience element in response to determining that the second combination of addresses matches the first combination of addresses; and
   utilizing the first relationship and the second relationship to identify an association between the other message and a particular address from the first combination of addresses.

2. The method of claim 1, further comprising normalizing the first combination of addresses.

3. The method of claim 1, further comprising marking one or more addresses of the first combination of addresses to indicate primary, secondary, or tertiary recipients.

4. The method of claim 1, further comprising creating a serialization of the first combination of addresses.

5. The method of claim 4, further comprising hashing the serialization using an algorithm to create an audience identifier associated with the serialization.

6. The method of claim 5, wherein the algorithm comprises MD5.

7. The method of claim 1, wherein the first combination of addresses comprises a plurality of e-mail addresses.

8. The method of claim 1, wherein the audience element comprises addresses of primary, secondary, and tertiary recipients.

9. The method of claim 1, wherein the audience element comprises only addresses of primary recipients.

10. A method, comprising:
    establishing by a computer an audience element comprising a combination of addresses identified as recipient addresses for one message;
    creating an audience identifier associated with the audience element;
    determining whether the audience identifier matches an audience identifier already stored in a memory;
    if the audience identifier does not match the audience identifier already stored in the memory:
        storing the audience identifier in the memory; and
        associating the audience element with the audience identifier; and
    if the audience identifier is matches the audience identifier already stored in the memory:
        associating the audience element with the audience identifier already stored in the memory.

11. The method of claim 10, wherein the audience identifier comprises an MD5 hash.

12. The method of claim 10, wherein the combination of addresses comprises a plurality of e-mail addresses.

13. The method of claim 10, further comprising storing another message associated with the audience element.

14. The method of claim 10, wherein the combination of addresses comprises addresses of each of a primary recipient, a secondary recipient, and a tertiary recipient.

15. The method of claim 10, further comprising normalizing and serializing the audience element.

16. A system, comprising:
    a memory operable to store one or more messages and one or more audiences; and
    a processor operable to perform the steps of:
        establishing an audience element comprising a first combination of addresses identified as recipient addresses for one message;
        creating a first relationship between the audience element and the first combination of addresses;
        determining whether a second combination of addresses identified as recipient addresses for another message matches the first combination of addresses;
        creating a second relationship between the other message and the audience element in response to determining that the second combination of addresses matches the first combination of addresses; and
        utilizing the first relationship and the second relationship to identify an association between the other message and a particular address from the first combination of addresses.

17. The system of claim 16, wherein the processor is further operable to perform the step of creating a serialization of the first combination of addresses.

18. The system of claim 17, wherein the processor is further operable to perform the step of hashing the serialization using an algorithm to create a hash associated with the serialization.

19. The system of claim 16, wherein the audience element comprises addresses of primary, secondary, and tertiary recipients.

20. A non-transitory computer readable medium comprising logic, the logic when executed by a computer operable to:
    establish an audience element comprising a first combination of addresses identified as recipient addresses for one message;
    create a first relationship between the audience element and the first combination of addresses;
    determine whether a second combination of addresses identified as recipient addresses for another message is the same as the first combination of addresses;
    create a second relationship between the other message and the audience element in response to determining that the second combination of addresses matches the first combination of addresses; and
    utilize the first relationship and the second relationship to identify an association between the other message and a particular address from the first combination of addresses.

* * * * *